United States Patent [19]

Muonro

[11] Patent Number: 4,773,668
[45] Date of Patent: Sep. 27, 1988

[54] TOWING HITCH

[76] Inventor: Grant Muonro, 42 Charles Street, Ascot Vale, Vic., Australia, 3032

[21] Appl. No.: 62,908

[22] Filed: Jun. 16, 1987

[51] Int. Cl.$^4$ ............................................. B60D 1/06
[52] U.S. Cl. .................................. 280/485; 267/138; 280/487; 280/489; 280/511
[58] Field of Search ............... 280/483, 484, 485, 486, 280/487, 489, 504, 506, 511, 515; 267/138

[56] References Cited

U.S. PATENT DOCUMENTS

| | | | |
|---|---|---|---|
| 2,067,794 | 1/1937 | Seyferth | 280/487 X |
| 2,513,932 | 7/1950 | Grube | 280/485 |
| 2,878,036 | 3/1959 | Simmons | 280/513 |
| 3,667,418 | 6/1972 | Janssen | 280/486 X |
| 3,708,183 | 1/1973 | Jones | 280/483 |

FOREIGN PATENT DOCUMENTS

| | | |
|---|---|---|
| 226129 | 6/1959 | Australia . |
| 538662 | 1/1981 | Australia . |
| 28991 | 5/1981 | European Pat. Off. ............ 280/483 |

Primary Examiner—John J. Love
Assistant Examiner—Mitchell J. Hill
Attorney, Agent, or Firm—Robert F. O'Connell

[57] ABSTRACT

A towing hitch is disclosed which has a housing for receiving a tow bar such that said housing can be pivotally connected to said tow bar. A tongue is coupled to the housing for receiving a towing element. The housing has a pin which project into said tow bar and said pin has a resilient block mounted thereon such that said block is arranged between said pin and said tow bar to dampen or absorb shock or vibration transmitted to said towing hitch.

2 Claims, 1 Drawing Sheet

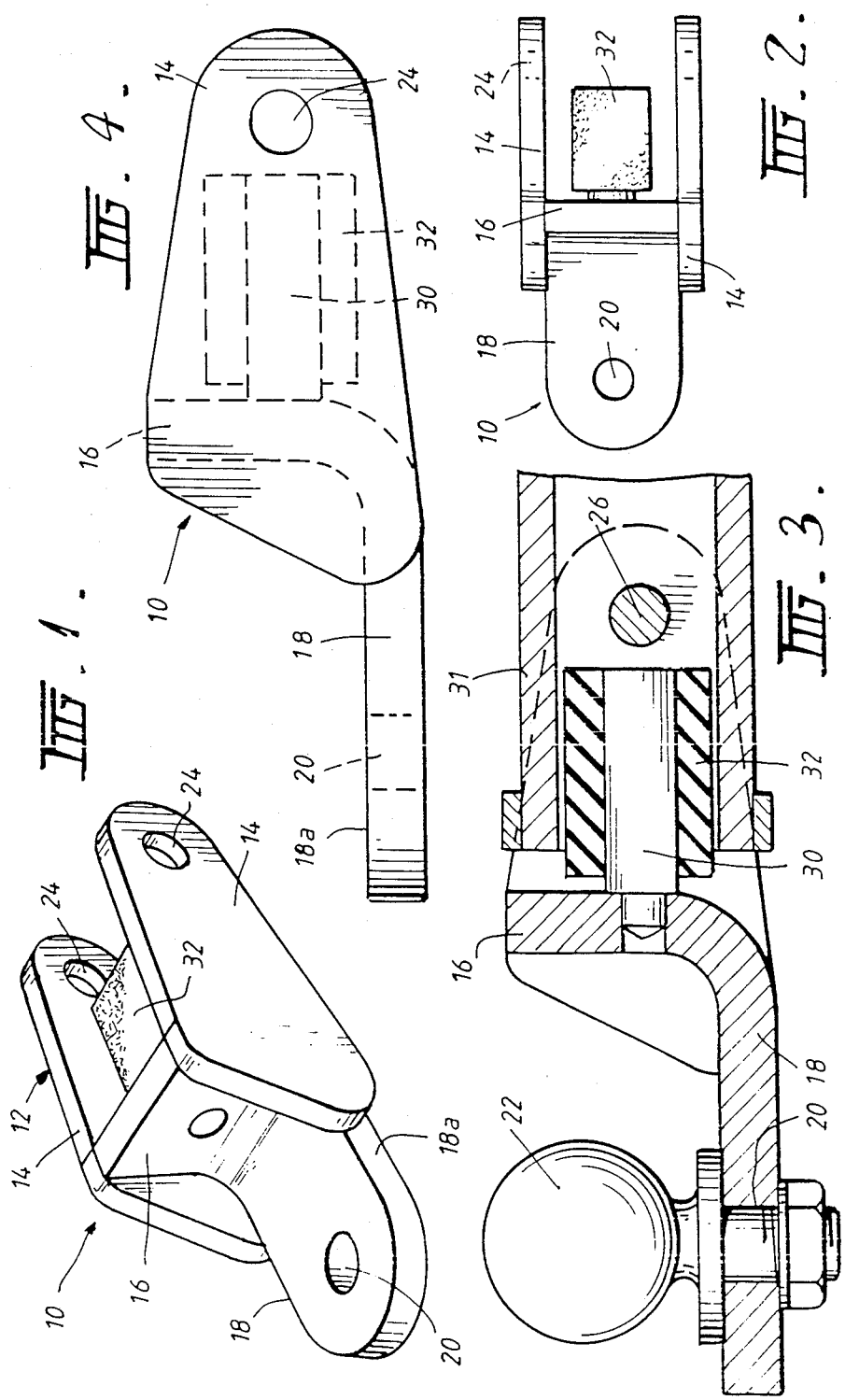

400
TOWING HITCH

This invention relates to a towing hitch.

Conventional towing hitches generally comprise a tongue to which is mounted a tow ball which in turn engages a correspondingly shaped coupling on the vehicle to be towed. Such towing hitches are adequate for vehicles used in built-up areas or smooth terrain but are not particular suited for use in rough terrain such as may be encountered by four wheel drive vehicles. This type of towing hitch, although allowing pivotal movement to take place between the tow ball and the correspondingly shaped coupling, forms a generally rigid system in which vibration and shock will be transmitted from the wheels of the towing and towed vehicles through the towing hitch which can cause damage to the towing hitch as well as to the vehicles.

To overcome this problem flexible towing hitches have been proposed in which springs or resilient pads are included to damp or cushion vibration and shock which is transmitted to the towing hitch. These towing hitches are generally complicated and relatively expensive to manufacture.

The object of this invention is to provide a flexible towing hitch which can dampen or absorb shock and which is simple in construction and relatively inexpensive to manufacture.

The invention may be said to reside in a towing hitch, said towing hitch comprising a housing for receiving a tow bar such that said housing can be pivotally connected to said tow bar, a tongue coupled to said housing for receiving a towing element, said housing having a projection therein projecting into said tow bar and said projection having resilient means mounted thereon such that said resilient means is arranged between said projection and said tow bar to dampen or absorb shock or vibration transmitted to said towing hitch.

Since the towing hitch according to this invention comprises a housing which receives the tow bar so that the tow bar can be pivotally coupled thereto and a projection which mounts a resilient element and which are inserted into the tow bar the towing hitch is simple and inexpensive to manufacture whilst providing good shock or vibration dampening or absorption.

Preferably the housing comprises a pair of side plates which have an aligned opening therein for receiving a pivot pin which passes through the side plates and through the tow bar which is adapted to be received between the side plates for pivotally coupling the tow bar to the housing, said housing having an end wall joining said side walls, said end wall have said projection which mounts said resilient means.

The end wall may comprise a portion of said tongue which is formed substantially at right angles to the portion of said tongue which mounts said towing element or the wall may comprise a separate wall which is connected to said tongue.

Preferably said towing element comprises a tow ball.

A preferred embodiment of the invention will be described in detail with reference to the accompanying drawings in which:

FIG. 1 is a perspective view of a towing hitch according to the preferred embodiment of the invention;

FIG. 2 is a plan view of the towing hitch of FIG. 1;

FIG. 3 is a cross-sectional view of the towing hitch mounted to a tow bar; and

FIG. 4 is a side view of the towing hitch of FIG. 1.

With reference to FIGS. 1 to 4, the towing hitch 10 comprises a housing 12 formed by a pair of side walls 14 and a rear wall 16. The rear wall 16 may comprise a portion of a tongue 18 or may be a separate wall to which the tongue 18 is coupled. In the embodiment shown in FIGS. 1 to 4 the wall 16 forms a portion of the tongue 18 which is arranged substantially at right angles to a horizontal portion 18a which is provided with a hole 20 for receiving a tow ball 22 (see FIG. 3).

The side walls 14 extend beyond the rear wall 16 and are securely welded to the rear wall 16 and to the portion 18a of tongue 18 so that the tongue 18 is securely coupled to the side walls 14. The side walls 14 include holes 24 toward the front thereof for receiving a pivot pin 26 (see FIG. 3) so that the towing hitch 10 can be pivotally coupled to a tow bar 31 (see FIG. 3) which is in the form of a square tube of size 2 inch by 2 inch and which is coupled to a towing vehicle (not shown).

A pin 32 is coupled to rear wall 16 of the housing 12 and mounts a resilient block 32 which is generally square in cross-section.

As best seen in FIG. 3 the pin 30 and shock absorbing pad 32 are dimensioned to fit into the open end of tow bar 31 which is coupled to and projects rearwardly of a towing vehicle (not shown). The tow bar 31 is received between the side walls 14 of housing 12 so that the pin 30 with the block 32 mounted thereon is received inside the tow bar 31 as best seen in FIG. 3. The tow bar 31 is provided with holes (not shown) for receiving pivot pin 26 which passes through side plates 14 and the tow bar 31 so that the tow bar 31 is pivotally coupled to the towing hitch 10.

The pivotal coupling of the tow bar 31 to the towing hitch 10 allows some vertical movement between the hitch 10 and the towing bar 31 and any shock or vibration which is transmitted through the towing or towed vehicles to the hitch 10 is absorbed or dampened by the resilient block 32 rather than being directly transmitted from the towing hitch 10 to the tow bar 31 or vise versa.

The preferred embodiment of the invention therefore provides a towing hitch which can be simple and economically manufactured and which is able to absorb or dampen shock or vibration which is transmitted to the towing system via the towed or towing vehicle. The resilient block 32 also enables some vertical movement between the tow bar 31 and the hitch 10 to take place by pivotal movement about the pivot pin 26 and by slightly compressing the resilient block 32.

Since modification within the spirit and scope of the invention may readily be effected by persons skilled within the art, it is to be understood that this invention is not limited to the particular embodiment described by way of example hereinabove.

I claim:

1. A towing hitch, said towing hitch comprising a housing for receiving a tow bar such that said housing can be pivotally connected to said tow bar, a tongue coupled to said housing for receiving a towing element, said housing having a projection therein projecting into said tow bar and said projection having resilient means mounted thereon such that said resilient means is arranged between said projection and said two bar, wherein the housing comprises a pair of side plates which have aligned openings therein for receiving a pivot pin which passes through the side plates and through the tow bar for pivotally coupling the tow bar to the housing, said housing having a rear wall joining said side walls, said rear wall receiving said projection between said side plates so that the projection and the resilient means mounted thereon can be inserted into the tow bar so that the tow bar is receivable between the side plates and the resilient means to allow limited pivotal movement between the tow bar and towing hitch while absorbing shock or vibration transmitted to the tow hitch.

2. The towing hitch of claim 1, wherein the rear wall is integrally formed with said tongue and is substantially at right angles to the portion of said tongue which mounts said towing element.

* * * * *